United States Patent
Platz et al.

(10) Patent No.: US 10,576,829 B2
(45) Date of Patent: Mar. 3, 2020

(54) METHOD FOR CONTROLLING A RECOVERY DEVICE OF A VEHICLE

(71) Applicant: Bayerische Motoren Werke Aktiengesellschaft, Munich (DE)

(72) Inventors: Christoph Platz, Unterschleissheim (DE); Christian Ebner, Munich (DE); Markus Hamm, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 454 days.

(21) Appl. No.: 14/132,598

(22) Filed: Dec. 18, 2013

(65) Prior Publication Data
US 2014/0103709 A1    Apr. 17, 2014

Related U.S. Application Data

(63) Continuation of application No. PCT/EP2012/061624, filed on Jun. 19, 2012.

(30) Foreign Application Priority Data

Jun. 30, 2011   (DE) .......................... 10 2011 078 436

(51) Int. Cl.
*B60L 11/00*       (2006.01)
*B60T 8/17*        (2006.01)
(Continued)

(52) U.S. Cl.
CPC ............... *B60L 11/002* (2013.01); *B60L 7/10* (2013.01); *B60L 7/20* (2013.01); *B60L 50/90* (2019.02);
(Continued)

(58) Field of Classification Search
CPC .......... B60T 13/74; B60T 7/00; B60T 8/1706; B60T 1/10; B60T 7/042; B60T 2270/604;
(Continued)

(56) References Cited

U.S. PATENT DOCUMENTS

2012/0080249 A1*  4/2012  Yates, III ................ B60L 7/18
                                                    180/65.31
2012/0255798 A1*  10/2012 Palmer ................... B60K 17/04
                                                     180/65.6

FOREIGN PATENT DOCUMENTS

DE    10 2008 017 480 A1    10/2008
DE    10 2007 035 424 A1     1/2009
(Continued)

OTHER PUBLICATIONS

Chinese Office Action issued in counterpart Chinese Application No. 201280023095.8 dated Nov. 9, 2015 with English translation (five pages).
(Continued)

*Primary Examiner* — Arnold M Kinkead
(74) *Attorney, Agent, or Firm* — Crowell & Moring LLP

(57) ABSTRACT

A method for controlling a recuperation device that converts kinetic energy into electric energy in a vehicle is provided. The method includes the acts of actuating at least one actuation element for generating a braking action, at least briefly arranging the actuated actuation element in at least one predefined first trigger position, and activating the recuperation device in a defined functional scope in response to the brief arrangement of the actuated actuation element in the at least one predefined first trigger position.

7 Claims, 1 Drawing Sheet

(51) Int. Cl.
  *B60T 1/10* (2006.01)
  *B60T 7/04* (2006.01)
  *B60W 10/08* (2006.01)
  *B60W 30/18* (2012.01)
  *B60W 10/18* (2012.01)
  *B60L 50/90* (2019.01)
  *B60L 7/10* (2006.01)
  *B60L 7/20* (2006.01)
  *B60T 13/74* (2006.01)
  *B60T 7/00* (2006.01)
  *B60W 20/00* (2016.01)

(52) U.S. Cl.
  CPC .................. *B60T 1/10* (2013.01); *B60T 7/00* (2013.01); *B60T 7/042* (2013.01); *B60T 8/1706* (2013.01); *B60T 13/74* (2013.01); *B60W 10/08* (2013.01); *B60W 10/18* (2013.01); *B60W 30/18127* (2013.01); *B60T 2270/604* (2013.01); *B60W 20/00* (2013.01); *B60W 2540/10* (2013.01); *B60W 2540/12* (2013.01)

(58) Field of Classification Search
  CPC ........... B60W 10/08; B60W 30/18127; B60W 10/18; B60W 2540/10; B60W 20/00; B60W 2540/12; B60L 11/002; B60L 50/90
  USPC .............................. 180/65.1; 701/22, 78, 41
  See application file for complete search history.

(56) References Cited

FOREIGN PATENT DOCUMENTS

| | | |
|---|---|---|
| DE | 10 2009 040 169 A1 | 3/2011 |
| EP | 1 547 891 A1 | 6/2005 |
| EP | 2 154 057 A1 | 2/2010 |
| EP | 2 314 486 A1 | 4/2011 |

OTHER PUBLICATIONS

International Search Report dated Sep. 11, 2012 w/ English translation (four (4) pages).
German-language Office Action dated Sep. 29, 2011 (five (5) pages).

* cited by examiner

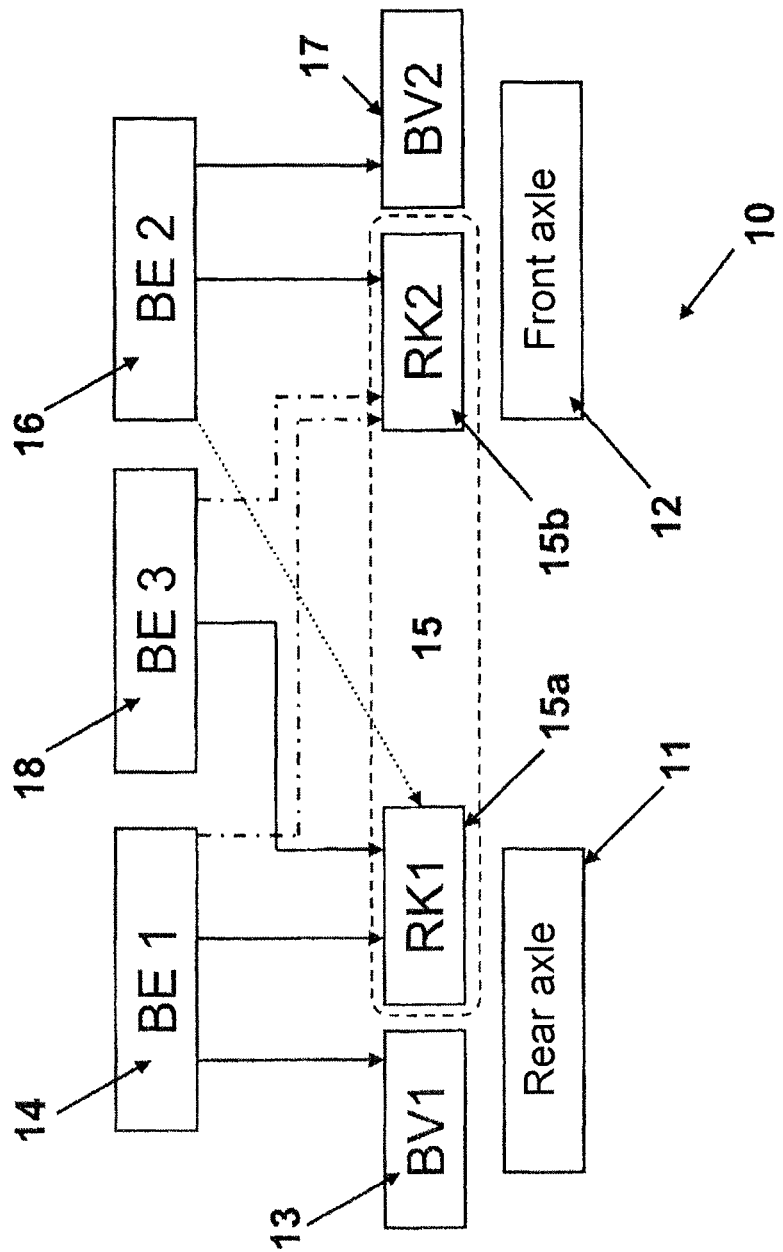

METHOD FOR CONTROLLING A RECOVERY DEVICE OF A VEHICLE

CROSS REFERENCE TO RELATED APPLICATIONS

This application is a continuation of PCT International Application No. PCT/EP2012/061624, filed Jun. 19, 2012, which claims priority under 35 U.S.C. § 119 from German Patent Application No. DE 10 2011 078 436.5, filed Jun. 30, 2011, the entire disclosures of which are expressly incorporated by reference herein.

BACKGROUND AND SUMMARY OF THE INVENTION

The present invention relate to a method for controlling a recuperation device that converts kinetic energy into electric energy in a vehicle.

Currently, vehicle manufacturers are increasingly focused on the development of vehicles having new and alternative drive concepts, particularly hybrid drives or pure electric drives instead of pure internal-combustion engines.

In order to increase efficiency of the new drives, various systems are known for saving energy and recuperating energy, particularly for the recuperation of electric energy from kinetic energy.

For example, German Patent Document DE 10 2008 017 480 describes a vehicle braking system for passenger cars in which a brake torque is generated by an electric motor in order to recuperatively provide electric energy therefrom. This energy is usually intermediately stored in energy storage devices, such as accumulators or capacitors.

Furthermore, a brake system, particularly for motorcycles or scooters, is described in German Patent Document DE 10 2009 040 169, which is distinguished by an electric motor driving the vehicle whose drive shaft is connected with a rear axle of the vehicle and, in addition, an automatic control system is provided which is configured such that, when a primary actuating device is actuated, it operates the electric motor as a generator for generating a recuperative brake torque onto the rear axle.

It is an object of the invention to provide an improved method for controlling a recuperation device of a vehicle, which ensures that the driver can operate the recuperation device as easily as possible.

According to the invention, this object is achieved by means of a method comprising the acts of actuating at least one actuating element of the vehicle for generating a braking effect; at least briefly arranging the actuated actuating element in at least one predefined first trigger position; activating the recuperation device in a defined range of functions in response to the at least brief arranging of the actuated actuating element in the at least one predefined first trigger position.

In addition, the at least one actuating element comprises at least one element from a group consisting of an actuating element for a drive actuation and/or an actuating element for a brake actuation.

This means that an actuation of the at least one actuating element for the drive actuation, thus for the control or automatic control of the vehicle drive, and/or for the actuation of the brakes of the vehicle, on the one hand, results in a movement of the respective actuating element itself. On the other hand, in both cases, a slowing-down of the vehicle is caused by the withdrawal of a drive actuation or an actuation of the brake mechanism. The respective actuating element is configured such that, as a result of its actuation, it is moved into the predefined position which causes the activation of the recuperation device.

A overlapping of the actually provided function of the respective actuating element with the activated recuperation can thereby take place or, as an alternative, a subsequent activation, which will be described in detail in the following.

The step of the at least brief arranging preferably takes place simultaneously during the step of actuating the at least one actuating element or as a result of it. This has the advantage that the steps for activating the recuperation to be carried out by the driver already takes place by the customary sequence of actions for slowing down the vehicle or are coupled with it. The recuperation therefore takes place without a required intervention by the driver so that the recuperation can be activated more frequently.

The activation can therefore take place in that the recuperation device provides a maximally possible recuperation effect or only a fraction thereof. In particular, the fraction can be controlled as a function of a momentary range of movements of the actuating element. If, for example, the actuating element is moved into a first predefined trigger position, activation takes place by means of a first value of the recuperation effect which is lower than a maximal value of the recuperation. If the movement of the actuating element is continued, the recuperation effect will increase as a function of the range of movements up to a predefined maximal value. Furthermore, the value or values, in addition to their predefinition, can also be controlled by a driver, particularly depending on the requirements. As a result, the driver can adjust how much the vehicle decelerates when one or more operating elements are actuated.

In each case, a deceleration value of between 0 and 100% may be provided as a maximum possible value for a recuperation, 100% corresponding to a full braking and thereby a braking effect being achieved by means of the recuperation device, as in the case of a complete braking by means of a conventional vehicle brake.

According to an embodiment, the actuating of the at least one actuating element is a restoring of an actuating element for a drive actuation to a neutral position, in which case, the neutral position is defined by a limit stop, and/or or comprises an actuating of an actuating element for a brake actuation, particularly the actuating of a brake lever, a brake pedal and/or a foot brake.

This means that the recuperation device can be activated in that an actuating element for the drive actuation is moved to a neutral position. The neutral position is normally defined by a limit stop, so that the actuating element is automatically restored to this neutral position as soon as no actuation takes place by the driver.

In the neutral position, a brake torque corresponding to a so-called drag torque or brake torque of an internal-combustion engine is therefore generated as a result of the recuperation. A restoring force for the actuating element is provided, for example, by restoring springs. The actuating element for a drive actuation is any component for actively controlling a vehicle speed or a drive torque in accordance with this description, which is therefore suitable for "giving gas", particularly a gas pedal, a driving performance value indicator or driving plate or a twist grip (for example, in the case of a motorcycle).

In addition or as an alternative, as described, the recuperation device can be activated by actuating an actuating element for a brake actuation. This takes place, for example, by actuating the brake lever, the brake pedal or the so-called foot brake. When at least one of these elements is actuated, a reduction of the vehicle speed always takes place by an active braking of the vehicle. However, the actuating element can be further developed such that a predefined first section of an actuation scope defines the at least one predefined first trigger position or a plurality of these trigger positions and at first causes only the activation of the recuperation device. Only an actuating of the actuating element beyond this first section leads to the actual activation of the pertaining vehicle brake.

This means that the actuating of the at least one actuating element according to a further embodiment can comprise an activating of at least one braking mechanism of the vehicle as soon as the at least one actuating element is arranged in at least one second predefined position.

In other words, a certain "free travel" can be defined or an existing "free travel" can be utilized in order to provide the activation of the recuperation device in the first section. Also for this embodiment, an extent of a recuperation effect can be made dependent on the range of movements of the actuating element in order to make the recuperation effect apportionable.

As described above, an overlapping of the recuperation actuation may also be accompanied by or provided with a simultaneous actuation of the actual function of the actuating element.

According to another embodiment, a definable fraction of a maximal recuperation of the vehicle is assigned to each of the at least one actuating elements and can be activated by means of this fraction. This means that only a predefined fraction of the maximal recuperation effect is assigned to one actuating element respectively. This predefinition may comprise either a fixed standard value or may, for example, be varied and adapted and therefore predefined by a driver. Only this fraction can therefore be maximally activated by actuating the actuating element. Activation beyond this point is not possible. However, as described above, the momentary recuperation effect achieved by means of the actuating element can be apportioned or controlled as a function of the range of its movements.

For example, a fraction of a maximal recuperation can therefore in each case be assigned to at least two actuating elements of the vehicle. Basically arbitrary fractions can be provided in this case. Their sum must not necessarily result in 100% but may also be lower. Preferably, a fraction, in each case, of ½ of the maximal recuperation or recuperation effect can be assigned to two defined actuating elements, or a fraction, in each case, of ⅓ of the maximal recuperation may be assigned to three defined actuating elements.

This means that an increase of the recuperation effect beyond the individually assigned fraction will be possible only by the interaction of the individual actuating devices. When, for example, a fraction, in each case, of ⅓ of the maximal recuperation effect is assigned to the twist grip, the first brake lever and the second brake lever respectively, a restoring of the twist grip to its neutral position causes an activation of the recuperation device in a limited functional scope with a fraction of only ⅓ of the maximal recuperation effect. An actuating of the first and/or of the second brake lever increases the recuperation effect again by ⅓ respectively.

Naturally, the actuating elements can be actuated independently of one another, particularly in an arbitrary sequence in order to make the recuperation effect variable for a driver.

It is further conceivable to provide at least one other additional operating element to which a fraction of a recuperation is also assigned. When this operating element is actuated in addition to one of the above-described actuating elements, the additional fraction is activated and a total value for the recuperation is thereby increased. In this manner, a simpler distribution of the fractions and therefore an easier handling and apportionability can be achieved for the driver.

According to a further embodiment, the method can also comprise a step for detecting the at least brief arranging of the actuated actuating element in the at least one predefined first trigger position, as well as a subsequent step of triggering a signal for the activation of the recuperation device in response to the at least brief arranging of the actuated actuating element in the at least one predefined first trigger position, and the step of activating the recuperation device can take place in response to the generated signal for the activation.

This means that corresponding sensors or devices for implementing the detection step are provided and operatively coupled with a corresponding control device so that, as a result of a positive detection, a corresponding signal can be generated in order to carry out activation in response to this signal.

The described vehicle may particularly be a motorcycle, a motor scooter, a trike, a quad or a vehicle similar to a motorcycle. A vehicle similar to a motorcycle is, for example, any 2-wheel, 3-wheel or 4-wheel or multi-wheel motorcycle.

Preferably, the described detection of an arrangement of the actuated actuating element may comprise a length-way measurement and/or a pressure measurement in a hydraulic pressure line coupled with the actuating element, particularly a use of a displacement transducer and/or of an angular-position measuring device. In this manner, a range of movements or a current position of the respective actuating element can be easily determined in order to carry out the described steps of the method according to the invention.

The invention will be explained in detail in the following with reference to the drawing by means of an embodiment.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 illustrates a schematic arrangement for implementing an embodiment of the method according to the present invention.

DETAILED DESCRIPTION OF THE DRAWING

According to an embodiment of the present invention, a vehicle 10 comprises a rear axle 11 and a front axle 12. A rear first braking mechanism 13 is assigned to the rear axle 11, which braking mechanism 13 can be actuated by a first actuating element 14 for brake actuation. Furthermore, the first actuating element 14 is configured such that an actuating of the first actuating element 14 into at least one predefined first trigger position comprises an at least partial activation of a recuperation device 15. In the illustrated embodiment, the recuperation device 15 comprises a rear fraction 15a which is assigned to the rear axle 11. Optionally, a front fraction 15b of the recuperation device 15 may be provided, which front fraction 15b is assigned to the front axle 12.

This front fraction 15b of the recuperation device 15 can be activated by means of a front second actuating element 16 for brake actuation. The front actuating element 16 is further provided for the actuation of a front braking mechanism 17. Optionally, the front second actuating element 16 can also be constructed for the actuation of the rear fraction 15a (broken arrow).

Furthermore, a third actuating element 18 is provided for drive actuation. By restoring from an actuation position (not shown) provided for the drive of the vehicle 10, this actuating element 18 can be moved into a neutral position which is defined by a limit stop. The restoring into the neutral position also causes an at least fractional activation of the recuperation device 15, particularly of the rear fraction 15a. Activation of the front fraction 15b by the third actuating element may take place as an alternative to activation of the rear fraction 15a, or in addition to activation of the rear fraction 15a (broken arrow).

Optionally, the first actuating element 14 activating the recuperation device 15 may be configured such that the first actuating element 14 activates the front fraction 15b as an alternative to activating the rear fraction 15a or in addition to activating the rear fraction 15a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a recuperation device that converts kinetic energy to electric energy in a vehicle, the method comprising the acts of:
   actuating at least one of a first actuating element, a second actuating element, or a third actuating element of the vehicle to produce a braking effect;
   moving the actuated actuating element to a first position; and
   activating the recuperation device in response to the moving of the actuated actuating element to the first position, wherein
   the recuperation device comprises a rear fraction which is assigned to the rear axle and which is actuatable by the first actuating element and a front fraction which is assigned to the front axle and which is actuatable by the second actuating element,
   the actuating of the first actuating element causes the recuperation device to recover ⅓ of the maximal energy that is recoverable, actuating of the second actuating element causes the recuperation device to recover another ⅓ of the maximal energy that is recoverable, and actuating of the third actuating element causes the recuperation device to recover a further ⅓ of the maximal energy that is recoverable.

2. The method according to claim 1, wherein the first, second, or third actuating element is actuated by returning the first, second, or third actuating element from a non-neutral position to a neutral position, the neutral position being defined by a limit stop, and the actuating of the first, second, or third, actuating element comprising the actuating of a brake lever, of a brake pedal, or of a foot brake.

3. The method according to claim 1, wherein the actuating of the first, second, or third actuating element comprises an activating of at least one braking mechanism of the vehicle, as soon as the first, second, or third actuating element is moved to a second position.

4. The method according to claim 1, further comprising the act of: triggering a signal for the activation of the recuperation device in response to the first, second, or third actuating element being in the first position.

5. The method according to claim 1, wherein the vehicle is a motorcycle, a motor scooter, a trike, a quad or a vehicle similar to a motorcycle.

6. The method according to claim 4, wherein the first position is detected using a hydraulic pressure measurement, a displacement transducer, or an angular-position measuring device.

7. The method according to claim 2, wherein the actuating of the first, second, or third actuating element activates at least one braking mechanism of the vehicle, in response to the moving of the first, second, or third actuating element to a second position.

* * * * *